Figure 1:
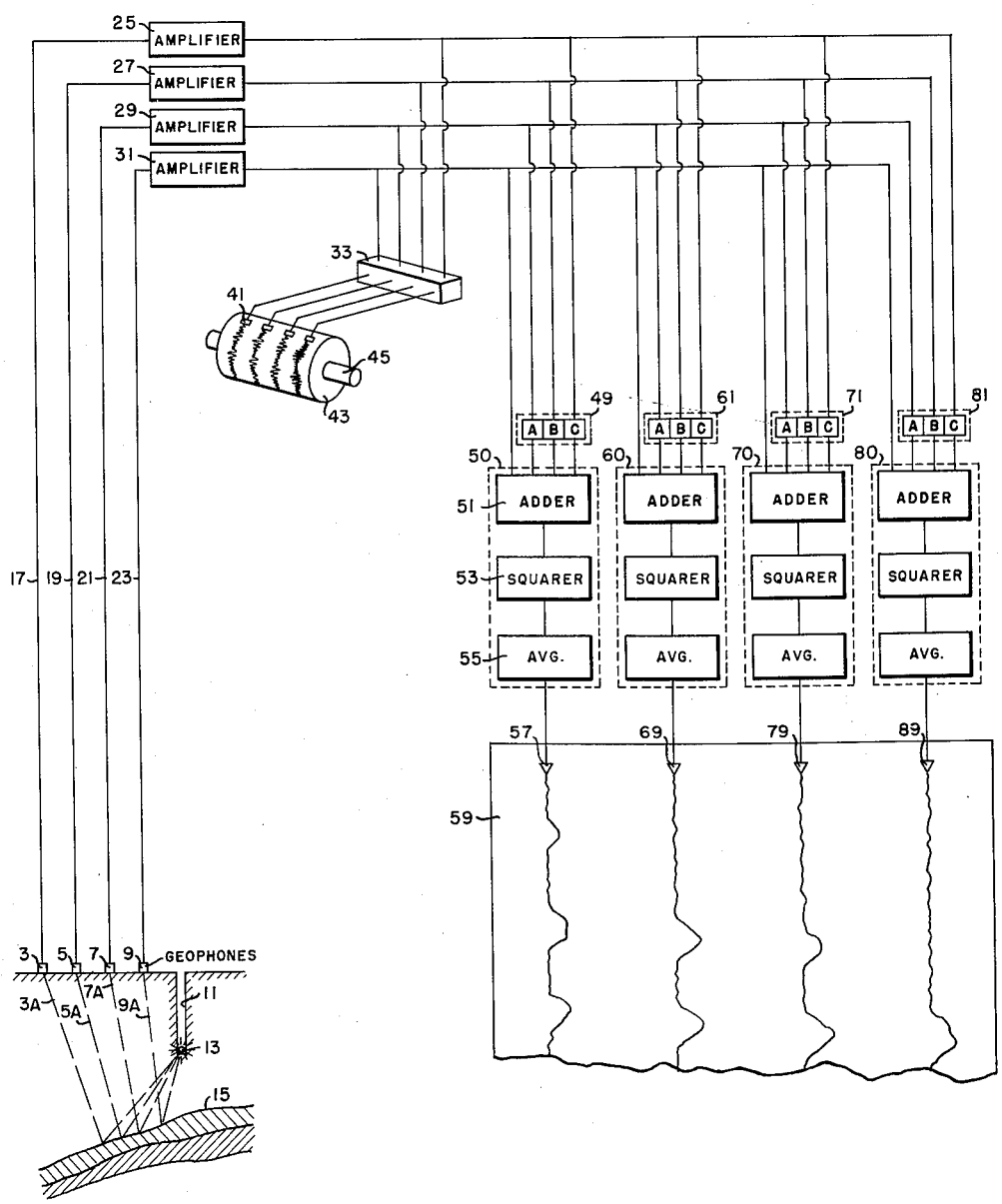

Dec. 26, 1961  F. J. FEAGIN ET AL  3,014,551
CORRELATION OF SEISMIC SIGNALS
Filed April 3, 1958  2 Sheets-Sheet 1

INVENTORS.
FRANK J. FEAGIN,
WILLIAM A. RUST, JR.,
BY ALPHONSE CHAPANIS,

*John B. Davidson*

ATTORNEY.

Dec. 26, 1961　　　F. J. FEAGIN ET AL　　　3,014,551
CORRELATION OF SEISMIC SIGNALS
Filed April 3, 1958　　　　　　　　　　　　　　　　2 Sheets-Sheet 2

INVENTORS.
FRANK J. FEAGIN,
WILLIAM M. RUST, JR.,
BY　ALPHONSE CHAPANIS,

John B Davidson

ATTORNEY.

United States Patent Office 3,014,551
Patented Dec. 26, 1961

3,014,551
CORRELATION OF SEISMIC SIGNALS
Frank J. Feagin and William M. Rust, Jr., Houston, Tex., and Alphonse Chapanis, Baltimore, Md., assignors, by mesne assignments, to Jersey Production Research Company, Tulsa, Okla., a corporation of Delaware
Filed Apr. 3, 1958, Ser. No. 726,108
3 Claims. (Cl. 181—.5)

This invention relates to geophysical prospecting, and more particularly to method and apparatus for interpretation and analysis of complex geophysical data expressed in the form of electrical signals having both coherent and incoherent components.

The general method of geophysical exploration utilizing seismic waves in the earth is well known. In general, this method comprises the steps of initiating a seismic impulse at or near the surface of the earth, and recording signals generated by transducers or geophones as a result of the earth movement at one or more points more or less spaced from the point of origin of the impulse. The recordation must be such that the time elapsing between the instant of the origination of the impulse and the signals generated as the result of the subsequent earth movement, may be determined. The original impulse sets up an elastic wave which is transmitted through the earth. Any discontinuity or variation of structure within the earth will reflect and/or refract this wave or a portion thereof so that a recording of the signals from the receiving points will comprise a number of arriving waves each derived from the original impulse and each differing from the others in time of arrival, magnitude, or both.

It has been found that the quality of seismic records is greatly dependent upon the skill of the field operator in properly adjusting his equipment and in determining the proper field parameters (such as the depth, location and size of the dynamite charge or other impulse generating means) to be used in a particular location. Technical improvements in the equipment used for seismic exploration, such as magnetic recording, have reduced the necessity for fine adjustments of the filtering, mixing, and automatic volume control circuits in the field. However, the operator in the field has had little scientific apparatus to assist him in selecting proper field parameters such as those mentioned above.

In the patent application of Frank J. Feagin, M. R. McPhail, and W. M. Rust, Jr. for "Method and Apparatus for Interpreting Geophysical Data," Serial No. 382,588, filed September 28, 1953, now U.S. Patent No. 2,927,656, there is described apparatus for use in connection with geophysical prospecting wherein intervals of a seismic record are selected for correlation, the portions selected being those that appear to contain coherent components of the seismic signals. In order to determine the time relationship between coherent components of the seismic signals within selected intervals, the signals are correlated in accordance with a selected criterion for best fit therebetween over the entire interval. Determination of best fit involves successively shifting the relationship of said traces and correlating the seismic traces over the interval for each selected relationship. An electrical output signal from the correlating apparatus indicates the degree of correlation; an extreme indication of the meter measuring the electrical signal indicates the time relationship between the seismic traces corresponding to maximum correlation therebetween.

In order to determine the optimum time relationship between coherent components over a selected interval of the seismic record, it is necessary to limit the interval to a relatively small segment of the record. The reason for this is that the seismic record, considered in its entirety, may contain coherent components having more than one optimum time relationship in different sections of the record. In other words, since coherent components of the seismic traces have different time relationships over different intervals of the seismograms, the interval of correlation mentioned above must be of necessity chosen to be over only a small part of the total seismic record.

In accordance with the spirit of the present invention, the correlation process such as described in the aforementioned Patent No. 2,927,656 is carried out over an interval which is continuously scanned or moved along the entire length of the seismic record. (Record length is usually about six seconds.) The scanning is carried out for each of a multiplicity of time relationships between the seismic traces. The multiplicity of time relationships may be derived by a multiplicity of time delay networks utilizing reactive elements in various combinations to provide the desired time delay relationships. Each scanning process results in a correlation trace for the entire seismic record and will indicate the degree of correlation for various sections of the seismic record for one time relationship between the traces.

The multiplicity of correlogram traces are recorded in side-by-side relationship with a common time scale to give an effective visual presentation of the correlation data for the whole seismic record. From the resulting correlogram, the optimum time relationship between traces and the degree of correlation corresponding thereto can be determined for any portion of the original seismogram. By examining a correlogram derived in the field in the manner described above, a field operator can determine whether or not his seismogram contains significant information, and if necessary, can vary field parameters to obtain more significant information from subsequent seismic impulses.

Figure 2:
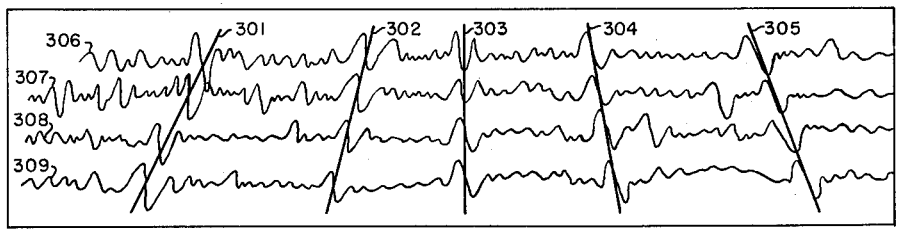
Figure 3:
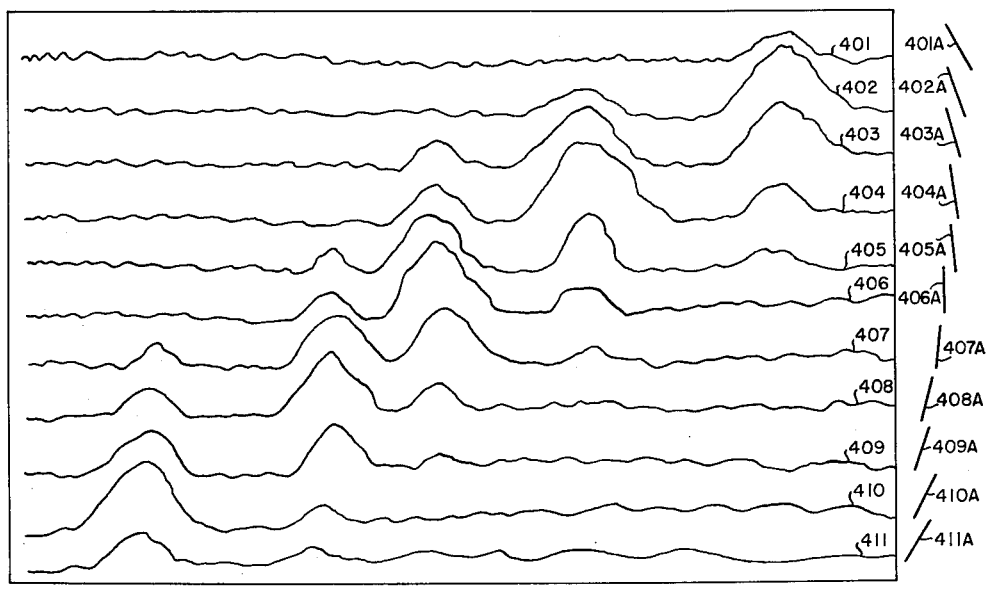

The following detailed description of the invention will be best understood by reference to the drawing in which:
FIG. 1 is a schematic representation of apparatus utilized in the practice of the present invention;
FIG. 2 is an idealized seismogram in "wiggly trace" form useful in understanding the present invention; and
FIG. 3 is a correlogram obtained from the seismogram of FIG. 2 which may be considered as representative of correlograms derivable in accordance with the teachings of the present invention.

With reference now to FIG. 1, there is shown a typical seismic prospecting system including a plurality of geophones 3, 5, 7, and 9, on or below the surface 1 of the earth, linearly disposed with respect to a shot hole 11. An explosive charge 13 in the bottom of the shot hole 11 will produce elastic waves within the earth which will spread in all directions from the explosive charge. Some of the energy will find its way to subterranean reflecting horizons, such as that designated by reference numeral 15, and a portion of this energy will be reflected and detected by the geophones. Ray paths 3A, 5A, 7A, and 9A depict in idealized form the paths that will be followed by the energy that is reflected by reflecting horizon 15.

The output signals of geophones 3, 5, 7, and 9 are amplified by seismic amplifiers 25, 27, 29, and 31, respectively, which are of conventional design. The output signals of the seismic amplifiers may be coupled to a recording medium which may be a conventional visual recording system wherein the output signals of the seismic amplifiers 25, 27, 29, and 31 are coupled to stylus actuating head 33 and recorded by a plurality of styli 41. The recording medium may be carried by a drum means 43 driven by a drive shaft 45 in the usual manner. Manifestly, other types of recording means may be used, systems using magnetic recording being preferred in view of the wide dynamic range of magnetic recordings.

The output signals of the seismic amplifiers 25, 27, and 29 are further coupled to several identical seismic correlating apparatus 50, 60, 70, and 80 by means of electrical time shifting means 49, 61, 71, and 81, respectively. The output signal of amplifier 31 is coupled to the various correlating apparatus directly without phase shifting. Each correlating apparatus is preferably of the type described in Patent No. 2,927,656 of Frank J. Feagin et al. As described above, the function of the correlating apparatus is to determine the optimum time relationship between coherent components of seismic signals. A preferred form of correlating apparatus comprises an adding circuit, an operational circuit, and an averaging circuit—connected in tandem in the order named. The operational circuit must perform a rectifying action on the signals and may emphasize in some desired way the signal's amplitude variations. A preferred operational circuit is the squaring circuit, which rectifies (since the square of both negative and positive excursions of the signal is positive) and also emphasizes the amplitude variations in an accepted manner. The multiplicity of seismic signals, after having been shifted in time by a predetermined amount, are coupled to the adding circuit. From the adding circuit is derived a summed signal indicative of the sum of the instantaneous amplitudes of the time shifted seismic signals. The amplitude variations of the summed signal are emphasized in some predetermined way in the operational circuit, and the resulting signal is averaged over an interval intended to be of sufficietnt duration to generally include any single seismic reflection but of insufficient duration to include many seismic reflections. The output signal of the averaging circuit will be indicative of the extent to which the incoherent components of the combined time shifted seismic signals cancel each other and of the extent to which the coherent components reinforce each other. In other words, the output signal will be indicative of the correlation between the time shifted signals.

While four seismic channels are shown, this number is chosen only for convenience of representation in the drawings and a greater number may be used. In conventional practice, 10 to 50 channels are used. Manifestly, a showing of more than four seismic channels would unduly complicate the drawings. It is to be understood, therefore, that the invention is not to be limited in any way to the specific number of seismic channels depicted in the drawings and described herein.

As mentioned before, the output signals of the seismic amplifiers 25, 27, and 29 are coupled to the plurality of seismic correlating devices 50, 60, 70, and 80 by electrical phase shifting means 49, 61, 71, and 81, respectively. The output signals of amplifier 31 are coupled directly to the seismic correlating devices. The phase shifting means 49, 61, 71, and 81 will be described in greater detail below.

The seismic correlating devices 50, 60, 70, and 80 should be substantially identical. As mentioned before, a preferred type of correlating device utilizes an adding circuit, an electrical squaring circuit, and an electrical averaging circuit in tandem connection, as is depicted by the apparatus designated by reference numerals 51, 53, and 55, with specific reference to correlating device 50. The electrical adding, squaring, and averaging circuits may be of conventional design. Other correlating devices than the specific type illustrated in FIG. 1 may be utilized. It is important to note that in this invention correlation over an interval is accomplished and that such correlation differs significantly from the simple sum of the instantaneous amplitudes of the signals. More specifically, the length of the correlating interval is determined by the time constant of the averaging circuit, which should be between 25 and 250 milliseconds. One reason for correlating over such an interval is that false indications of correlation may be obtained should the correlation be attempted over too narrow an interval. It is to be further noted that the correlation interval must be sufficiently narrow as to include substantially only one seismic reflection on the seismic record. More specifically, it is known that various subsurface earth formations have different dips with respect to the earth's surface so as to produce different time relationships between the reflected seismic signals as detected by geophones spread over the surface of the earth. An attempt to correlate signals (or records thereof) from more than one subterranean interface earth formation would be undesirable and difficult to interpret if those formations had different dips. In addition, the correlating device should be of a type adapted to apply a criterion for best fit of the traces over an interval of a seismic record. The device shown in block form in FIG. 1, for example, applies the arbitrary least square criterion as described in the aforementioned Patent No. 2,927,656, of Frank J. Feagin et al.

The output signals of the averaging circuits of the correlating devices are coupled to a recording device 59, such as a drum, which may be mechanically coupled to the drive shaft 45. Recording heads 57, 69, 79, and 89 are for recording the output signals of correlating devices 50, 60, 70, and 80, respectively. Recording pens may be used for recording the electrical output signals of the correlating devices in visual "wiggly trace" form. If desired, the electrical output signals may be recorded in variable density form using appropriate styli on electrosensitive paper. Alternatively, recordings (either in wiggly trace form or variable density form) may be done first on film or photographic paper, for subsequent developing and inspection by the field operator. The correlation signals produced on the recording medium of recording device 59 may be recorded according to the same time scale as the seismogram recorded on drum 43.

As mentioned above, the output signals of amplifier 31 are coupled directly to the adding circuit of the various correlating devices. The output signals of the other seismic amplifiers thus may be shifted in time with reference to the output signal of amplifier 31. The delay devices 49, 61, 71, and 81 may be conventional electrical circuits utilizing resistive and reactive elements to retard the time relationship of the output signals of the seismic amplifiers coupled thereto with respect to the output signal of amplifier 31. It is important that the individual sections A, B, and C of any one of the delay devices 49, 61, 71, and 81 shift the time of each of the successive output signals by successive integral multiples of the basic delay time of section A with respect to the output signal of amplifier 31. In other words, assuming that section A of delay device 49 shifts the output signal of amplifier 29 so that it lags the output signal of amplifier 31 by a predetermined amount (for example, .01 second), the sections B and C of time shifting device 49 should respectively shift the time of the output signals of amplifiers 27 and 25 so that they will lag the output signal of amplifier 31 by successive integral multiples thereof (in the example, by delays of .02 and .03 seconds, respectively. Furthermore, the basic delay times of the various delay devices 49, 61, 71, and 81 should be different. For example, elements A of time shifting devices 49, 61, 71, and 81 may shift the output signals of amplifier 29 through times of .01, .015, .02, and .025 seconds, respectively. In this event, elements B of the time shifting devices will shift the output signals of amplifier 27 through times of .02, .03, .04, and .05, respectively, and elements C will shift the output signals of amplifier 25 through times of .03, .045, .046, and .075 seconds, respectively. To obtain reversed time relationships between traces, the output signal of amplifier 25 may be used as the reference, and the output signals of the other amplifiers delayed with respect thereto.

The choice of successive integral multiples of a basic time delay represents a compromise. Actually a plot of the times of arrival of a reflection at successive detectors, as shown on a record such as FIG. 2, deviates from a straight line by an amount usually called "normal move-out." The effect of this compromise is to reduce the indicated degree of correlation. However, this effect is not serious except when the reflecting bed depth is comparable with or small compared to the maximum distance from the shot to the detectors. Means for correcting for the "normal move-out" are feasible, but add to the complexity of the field equipment. Of course, when the record is made in a reproducible form, such as magnetic tape, it is entirely practical to make such corrections during the office playback of the record.

The field equipment described in FIG. 1 and in preceding paragraphs involves a multiplicity of sets of time shifting devices so that correlograms can be simultaneously recorded for a multiplicity of basic time delays. The amount of equipment involved may be substantially reduced if the initial record is made in reproducible form, such as on magnetic tape. A single set of time shifting devices with adjustable basic delay time can be employed. The initial record is played back a multiplicity of times, with the basic delay time changed for each playback. This can readily be done in the field, rapidly enough to be useful as a guide to the operator.

With reference now to FIG. 2, there is shown an idealized seismogram in "wiggly trace" form. A number of distinct reflections identified by reference numerals 301, 302, 303, 304, and 305 appear on the seismogram. Note that these reflections appear at different times on the various traces of the seismogram. Note further that the traces must be shifted by different amounts to bring the various reflections into line.

The correlogram shown in FIG. 3 may be derived with the seismogram of FIG. 2 by the apparatus described above utilizing eleven seismic correlating channels instead of four, as shown. The correlogram and the seismogram have the same time scale. The sloped lines to the right of the correlogram traces indicate the time shifts required to produce the correlogram traces from the seismogram of FIG. 2. The sloped line adjacent each trace indicates the time shift with which the trace was made. The vertical line 406A indicates that the seismic traces were coupled to the correlator without time shift. Lines 401A through 405A indicate that traces 308, 307, and 306 are shifted to lag in time behind trace 309. Lines 407A through 411A indicate that traces 307, 308, and 309 are shifted to lag in time behind trace 306. The degree of inclination from the vertical of the various sloped lines indicates the magnitude of the time shift corresponding thereto.

The time shifts required to effect optimum correlation between the traces of FIG. 2 for various intervals thereof can be readily ascertained from the correlogram of FIG. 3. Note that some degree of correlation is indicated by all of correlogram traces 407 through 411 for the section of the seismogram including reflected event 301, maximum correlation being shown by trace 410. This means that the time shift indicated by sloped line 410A will produce optimum correlation for the first section of the record. Similarly, optimum correlation for successive portions or sections of the record is indicated by traces 408, 406, 404, and 402 of the correlogram. The time shifts 408A, 406A, 404A, and 402A corresponding to these traces will effect optimum correlation for the successive sections of the record. Note that the correlogram provides a means for readily detecting reflected events on the seismogram, for determining the time shift required to produce optimum correlation between seismic traces at these events, and for determining the degree of correlation at these events.

It will be found that the correlation information is presented in a visually effective form so that the various coherent components of the seismogram can be readily identified and the time relationship therebetween quickly and accurately determined. A field operator can refer to the correlogram obtained as described above shortly after activation of the explosive charge or other seismic impulse producing means. He can quickly determine whether significant subsurface information was obtained utilizing a particular size, location, and depth of explosive charge and can vary the field parameters as necessary to obtain more significant information from subsequent seismic impulses. Manifestly, the fact that a correlogram is obtainable substantially simultaneously with the production of a seismogram affords operational advantages that can greatly facilitate the obtaining of significant information relative to subsurface earth formations.

The invention is not to be restricted to the specific structural details, arrangement of parts, or circuit connections herein set forth, as various modifications thereof may be effected without departing from the spirit and scope of this invention.

What is claimed is:

1. Seismic prospecting apparatus comprising: a plurality of geophones rectilinearly disposed along the surface of the earth adapted to produce electrical signals indicative of seismic waves detected thereby as the result of a seismic pulse; a plurality of sets of electrical time shifting means operatively connected to said geophones, each set being electrically connected to each of said geophones, each set being adapted to shift the time relationship of all but one of the electrical signals from said geophones relative to said one signal by successive integral multiples of a basic time shift, said basic time shift being different for each set of time shifting means; an electrical correlation means corresponding to each of said sets of time shifting means and electrically connected thereto said correlating means including means for electrically combining and averaging the time shifted signals connected thereto to correlate over a time interval the time shifted signals coupled thereto to derive an electrical output signal indicative of said correlation; and means in circuit relationship with said electrical correlating means for recording the output signals of said correlating means in side-by-side relationship in the order of the magnitude of the basic time shift of the time shifting means coupled thereto.

2. Apparatus for correlating a plurality of electrical signals indicative of seismic waves detected by a plurality of geophones as the result of an artificial seismic impulse, comprising: a plurality of sets of electrical time shifting means electrically connected to each of the geophones, each set of time shifting means being adapted to shift the time relationship of all but one of said electrical signals relative to said one electrical signal by successive integral multiples of a basic time shift, said basic time shift being different for each set of time shifting means; adding circuit means for each of said sets of time shifting means electrically connected to said each set of time shifting means adapted to add together the time shifted signals therefrom; squaring circuit means for each of said adding circuit means and in circuit relationship therewith, adapted to square the amplitude of the output signal from the adding circuit means coupled thereto; averaging circuit means for each of said squaring circuit means electrically connected to said each squaring circuit means adapted to average the output signal of the squaring circuit means coupled thereto, the time constant of the averaging circuit being between 25 and 250 milliseconds over an interval effectively between 25 milliseconds and 250 milliseconds in duration; and means electrically connected to said averaging circuit means for recording the output signals of all of said averaging circuit means.

3. Apparatus for correlating a plurality of electrical signals indicative of seismic waves detected by a plurality of geophones as the result of an artificial seismic impulse, comprising: a plurality of sets of electrical time shifting means electrically connected to the geophones, each set of time shifting means being adapted to shift the time relationship over all but one of said electrical signals relative to said one electrical signal by successive integral multiples of a basic time shift, said basic time shrift being different for each set of time shifting means; adding circuit means for each of said sets of time shifting means electrically connected to said each set of time shifting means, adapted to add together the time shifting signals from said each set of time shifting means; squaring circuit means for each of said adding circuit means electrically connected to said each adding circuit means, adapted to emphasize the amplitude variations of the output signals from the adding circuit means coupled thereto; averaging circuit means for each of said squaring circuit means and electrically connected thereto, adapted to continuously average the output signal of the squaring circuit means coupled thereto over an interval of sufficient duration to generally include any signal seismic reflection event but of insufficient duration to include more than one seismic reflection event; and means in circuit relationship with each of said averaging circuit means for recording the output signals of all said averaging circuit means in side-by-side relationship.

References Cited in the file of this patent

UNITED STATES PATENTS

| | | | |
|---|---|---|---|
| 2,144,812 | Rieber | Jan. 24, | 1939 |
| 2,275,736 | Cloud | Mar. 10, | 1942 |
| 2,427,421 | Rieber | Sept. 16, | 1947 |
| 2,688,124 | Doty et al. | Aug. 31, | 1954 |
| 2,779,428 | Silverman | Jan. 29, | 1957 |
| 2,794,965 | Yost | June 4, | 1957 |
| 2,826,750 | Grannemann | Mar. 11, | 1958 |
| 2,888,089 | Piety | May 26, | 1959 |
| 2,897,476 | Widess | July 28, | 1959 |